US007325029B1

(12) United States Patent
Chang

(10) Patent No.: US 7,325,029 B1
(45) Date of Patent: Jan. 29, 2008

(54) METHODS FOR ENABLING E-COMMERCE VOICE COMMUNICATION

(76) Inventor: Ifay F. Chang, 3 Louis Dr., Katonah, NY (US) 10536

( * ) Notice: Subject to any disclaimer, the term of this patent is extended or adjusted under 35 U.S.C. 154(b) by 612 days.

(21) Appl. No.: 09/634,139

(22) Filed: Aug. 8, 2000

(51) Int. Cl.
*G06F 15/16* (2006.01)
(52) U.S. Cl. .................... 709/203; 709/238; 370/352
(58) Field of Classification Search ............ 709/200, 709/203, 230–232, 238, 206, 218; 370/401, 370/522, 352, 389; 379/45, 418, 209, 88, 379/100; 704/235; 372/52
See application file for complete search history.

(56) References Cited

U.S. PATENT DOCUMENTS

| | | | |
|---|---|---|---|
| 5,838,682 A * | 11/1998 | Dekelbaum et al. ........ 370/401 |
| 5,913,040 A * | 6/1999 | Rakavy et al. ............. 709/232 |
| 6,028,917 A * | 2/2000 | Creamer et al. ....... 379/100.01 |
| 6,078,581 A * | 6/2000 | Shtivelman et al. ........ 370/352 |
| 6,125,126 A * | 9/2000 | Hallenstål .................. 370/522 |
| 6,144,667 A * | 11/2000 | Doshi et al. ................ 370/401 |
| 6,167,376 A * | 12/2000 | Ditzik ........................ 704/235 |
| 6,212,535 B1 * | 4/2001 | Weikart et al. ............. 715/513 |
| 6,223,213 B1 * | 4/2001 | Cleron et al. .............. 709/206 |
| 6,275,490 B1 * | 8/2001 | Mattaway et al. .......... 370/352 |
| 6,295,357 B1 * | 9/2001 | Staples et al. .............. 379/418 |
| 6,377,568 B1 * | 4/2002 | Kelly ......................... 370/352 |
| 6,442,169 B1 * | 8/2002 | Lewis ........................ 370/401 |
| 6,446,082 B1 * | 9/2002 | Arita ........................ 707/104.1 |
| 6,501,779 B1 * | 12/2002 | McLaughlin et al. ......... 372/52 |
| 6,510,417 B1 * | 1/2003 | Woods et al. ............... 704/275 |
| 6,532,286 B1 * | 3/2003 | Burg .................... 379/209.01 |
| 6,532,288 B1 * | 3/2003 | Wood et al. ................ 379/224 |
| 6,539,015 B2 * | 3/2003 | Voit ........................... 370/389 |
| 6,594,254 B1 * | 7/2003 | Kelly ......................... 370/352 |
| 6,594,705 B1 * | 7/2003 | Philyaw ..................... 709/238 |
| 6,606,374 B1 * | 8/2003 | Rokoff et al. ............ 379/88.16 |
| 6,625,258 B1 * | 9/2003 | Ram et al. ............... 379/88.13 |
| 6,650,901 B1 * | 11/2003 | Schuster et al. ............. 379/45 |

(Continued)

OTHER PUBLICATIONS

Functional Architectural Design For Internet Telephony Gateway—Chin Dong booch.sas.ntu.ac.sg:8080/iccs98b.ps.*
Mississippi Lawyers and Judiciary Guide to the Internet; www.mslegalforms.xom/guide.html.*

(Continued)

*Primary Examiner*—Thong Vu
(74) *Attorney, Agent, or Firm*—Rodney T Hodgson

(57) ABSTRACT

Methods for operating multimedia computers to provide e-commerce voice communication capability directly between any computer connected to a computer network such as the Internet and any telephone device connected to the PSTN are disclosed. A simple click and call method is enabled by employing call interface software and the standard communication protocol over the network. The e-commerce voice communication system (EVCS) represented by an e-commerce voice communication symbol on a web page which, upon clicking, launches the call interface program, initiates a real-time communication channel between the client computer and the receiving computer, dials the desired telephone number via a voice modem. The EVCS method receives packets of voice data from the client computer, reassembles the packets of voice data into a stream of digital voice data, converts it to a stream of analog voice data, outputs the analog voice data to the voice modem, and outputs the analog voice data from the voice modem to the telephone line and vice versa from the telephone line to the client computer.

14 Claims, 12 Drawing Sheets

U.S. PATENT DOCUMENTS

| | | | |
|---|---|---|---|
| 6,791,974 B1 * | 9/2004 | Greenberg | 370/352 |
| 6,826,174 B1 * | 11/2004 | Erekson et al. | 370/352 |
| 6,865,719 B1 * | 3/2005 | Nicholas, III | 715/856 |
| 6,996,609 B2 * | 2/2006 | Hickman et al. | 709/218 |
| 7,103,563 B1 * | 9/2006 | Voisin et al. | 705/14 |
| 2001/0018858 A1 * | 9/2001 | Dwek | 84/609 |
| 2003/0182184 A1 * | 9/2003 | Starsnick et al. | 705/14 |

OTHER PUBLICATIONS

WebCQ—Detecting and Delivering Information—Evaluation Action Notification Email, Webpage,Phone, Fax, page fetch Webpage Static Page www.cc.gatech.edu/projects/disl/WebCQ/document/webcq-cikm00.pdf.*

* cited by examiner

E-directory
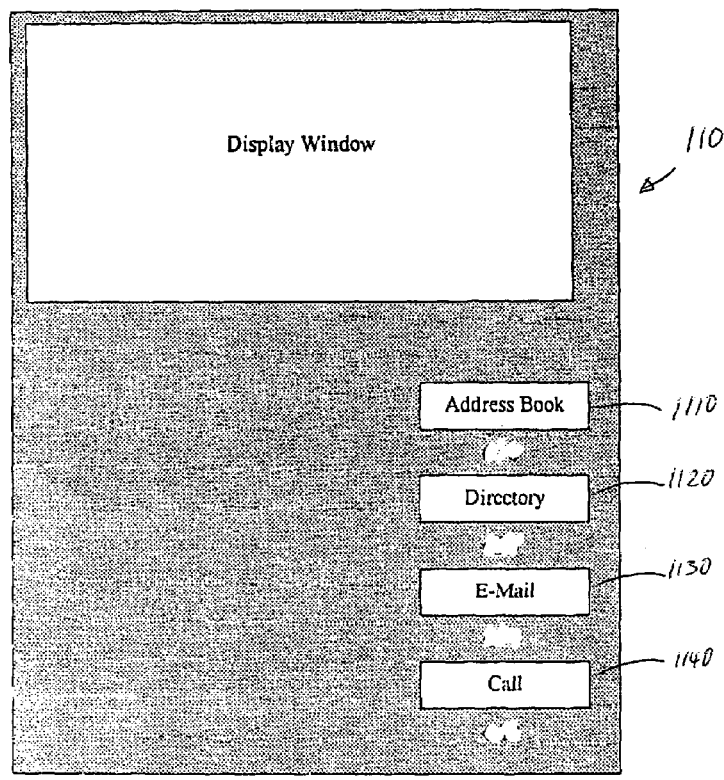
FIG. 9A
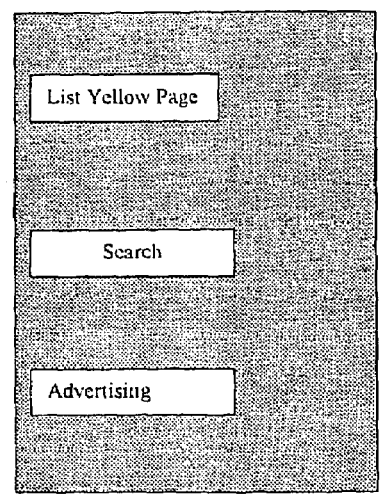
FIG. 9B
FIG. 9C

Note: There are two possible implementations of this solution: 1. Outside of Firewall (Internet) 2. Inside of Firewall (Intranet)

Demo 2: E-Commerce

Jim is interested in purchasing a product from Acme online. However, he has some questions about the product. Jim clicks on the EVS icon on Acme's web page to initiate a call to Sam at Customer Service.

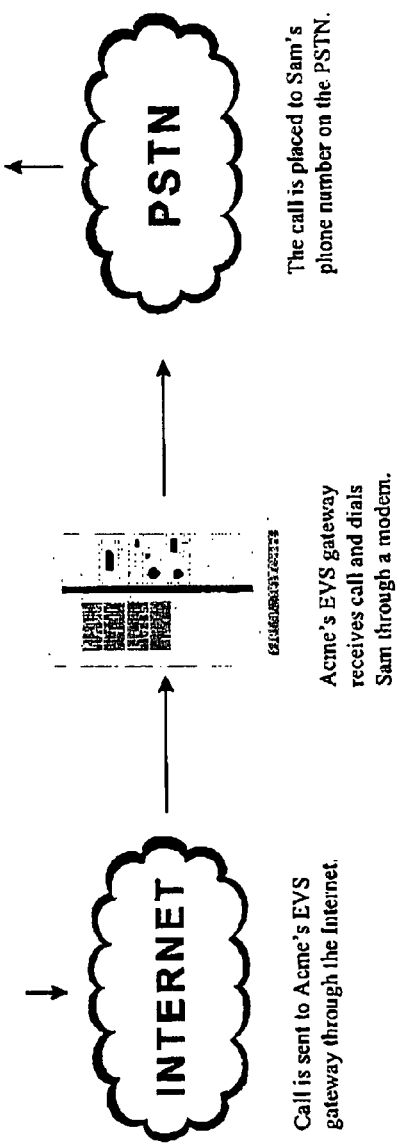

Sam answers call from regular telephone at Acme's Customer Service Desk. He gathers the product information and helps Jim with his questions.

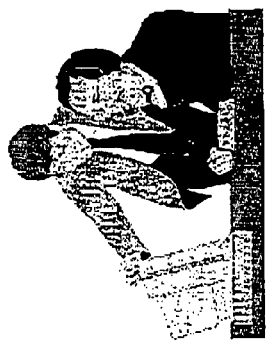

Call is sent to Acme's EVS gateway through the Internet.

Acme's EVS gateway receives call and dials Sam through a modem.

The call is placed to Sam's phone number on the PSTN.

FIG 10B

METHODS FOR ENABLING E-COMMERCE VOICE COMMUNICATION

BACKGROUND OF THE INVENTION

The present invention relates to voice communications for supporting e-commerce. More particularly, the present invention relates to voice communications over the Internet.

The growth of the Internet, World Wide Web and their users has induced the development of numerous applications. Internet with the voice-over-IP (VOIP) technology has become a major network player in telecommunication. PC to PC Internet telephony, an Internet application, has certainly attracted a lot of attention recently. Internet telephony represents a generic technology and/or application which utilizes the Internet protocol to facilitate a low cost phone call using the Internet network. The most technical and business developments in Internet telephony are focused on serving the mass telephone user market. The technical inventions and solutions are centered around replacing existing telecommunication network with new gateways, switches and routers, hence more hardware oriented. The challenges facing these developments are therefore in (1) scaling the gateway cards, boards or machines to handle thousands of voice channels, (2) making reliable connection and switching device or gateway across geographically distributed different hardware systems to serve the mass users and (3) monitor and manage usage, tariff and billing for the mass users.

In addition to the telephone services application, voice over IP technology has been applied to the FAX application again by-passing inter-exchange carriers for lower costs. Voice over IP has also been applied to the traditional Call Centers to provide low-cost call back phone services. Voice over IP can also be integrated with other applications, such as video conference, electronic white board, and collaborative web page browsing on a common platform. A set of fundamental technologies such as H.323 protocol stack and CODEC have been used to support these new applications.

The above prior art are generally limited to PC to PC communication through Internet. When the end user extends a PC call to a POTS phone from Internet through PSTN, special hardware gateway infrastructure is required. Unfortunately, such hardware system and network infrastructure with special circuit boards are usually very expensive and difficult to build up to cover all geographical regions where end users reside.

Thus what is needed in the industry are methods and apparatus that provide voice communications over the Internet that do not have the drawbacks described above. The objective of the present invention is to implement the efficient VOIP technology in the existing network infrastructure inexpensively and effectively to serve any user at any location.

SUMMARY OF THE INVENTION

The present invention relates to Internet voice communications. More particularly, the present invention relates to computer servers supporting direct web page to telephone communication over the Internet. Communications between the Internet and a PSTN utilize existing switching and signaling systems, thus the need for gateway devices or special telephone devices is greatly reduced.

A method and a computer server system (E-commerce voice communication system, EVCS) are disclosed which provide the capability of establishing an Internet communication session to receive and send voice over IP protocol and making a direct connection to a PSTN POTS phone via a voice modem. The computer server uses hardware sound card and a full-duplex voice modem and a gateway software program to accomplish a direct communication link from the web page to a POTS phone through Internet and PSTN networks. An interface program is provided to a multimedia or voice and sound enabled PC, for any PC and Internet user to initiate and complete a voice communication session with any telephone user through the EVCS. The method includes establishing connection to the server, setting up a VoIP session, dialing a POTS phone and facilitating full-duplex voice communication.

In the embodiments of the present invention, an end user viewing a web page through a conventional browser from the Internet can be directly connected to a live person (sales line), or otherwise, associated with the web site, such as a voice recording. The connection is typically initiated via a user's multimedia computer, and is received by a gateway server. The gateway server includes conventional hardware such as a voice modem, that is coupled to a PSTN and uses the conventional hardware to initiate a telephone call out to the telephone network. Typically, the telephone call is to a telephone number of a person or a business associated with the web page. In one embodiment, the gateway server and a server for providing web pages may reside on the same physical server computer; and in another embodiment, the gateway server and the server providing the web pages may reside on the different physical server computers.

According to an aspect of the invention, a method for operating a server is disclosed. The technique includes receiving a page request for a web page from a client computer via the Internet, the web page including an icon, retrieving the web page from a stoeage of the server, sending the web page to the client computer via the Internet, and receiving a request from the client computer to initiate a telephone call via the Internet in response to a selection of the icon on the web page. The method also includes initiating a real-time communications channel between the client computer and the server via the Internet in response to the request, determining a telephone number in response to the request, and using a voice modem, coupled to the server and to a telephone line, to dial the telephone number. Receiving packets of voice data from the client computer from the Internet, and reassembling the packets of voice data into a stream of digital voice data is also contemplated. The steps of converting the stream of digital voice data to a stream of analog voice data, outputting the stream of analog voice data to the voice modem, and outputting the stream of the analog voice data from the voice modem to the telephone line is also performed.

According to another aspect of the invention, a method for operating a server is disclosed. The technique includes receiving a request at a server from a client computer to initiate a telephone call via a computer network, the request from the client computer in response to a selection of an icon on a web page, the web page retrieved from the server and downloaded to the client computer, initiating a real-time communications channel at the server to the client computer via the computer network in response to the request from the client computer, and determining a telephone number to dial in response to the request. The technique also includes dialing the telephone number on a telephone with a voice modem, the server comprising the voice modem and the voice modem coupled to the telephone line, receiving packets of voice data at the server from the client computer, and reassembling at the server the packets of voice data into a stream of digital audio data. Additional steps of converting the stream of digital audio data to a stream of analog audio data with a sound board within the server, outputting the stream of analog audio data to the voice modem, and outputting the stream of the analog audio data from the voice modem to the telephone line is provided.

According to yet another aspect of the invention, a method for an Internet Service Provider server is disclosed. The method includes receiving a request to initiate a telephone call via the server from a client computer, determining a telephone number for the telephone call in response to the request, and using a voice modem in the server to dial the telephone number on a telephone line. The technique also includes opening a real-time communications channel between the client computer and the server via a computer network in response to the request, and thereafter receiving packets of voice data from the client computer from the Internet, and reassembling the packets of voice data into a stream of digital voice data. Converting the stream of digital voice data to a stream of analog voice data with a sound processor in the server, outputting the stream of analog voice data from the sound card to the voice modem, and outputting the stream of the analog voice data from the voice modem to the telephone line are also contemplated.

According to yet another aspect, a method for installing a telecommunications server on a server is disclosed, the server including a voice modem. The method includes installing a voice communications protocol onto the server, the voice communications protocol configured to enable establishment of a real time communications channel with a telecommunications client, the voice communications protocol configured to enable receipt of packets of digital voice data, and the voice communications protocol configured to enable output of a stream of digital voice data in response to the packets of digital voice data. The technique also includes installing an application program onto the server, the application program configured to receive the stream of digital voice data, and the application program configured to send the stream of digital voice data to the voice modem.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9a-c illustrate graphical user interfaces according to embodiments of the present invention;

FIGS. 10a-10c illustrate embodiments of the present invention illustrating the architectural set up and system configuration of EVCS.

DESCRIPTION OF THE SPECIFIC EMBODIMENTS

Figure 1:
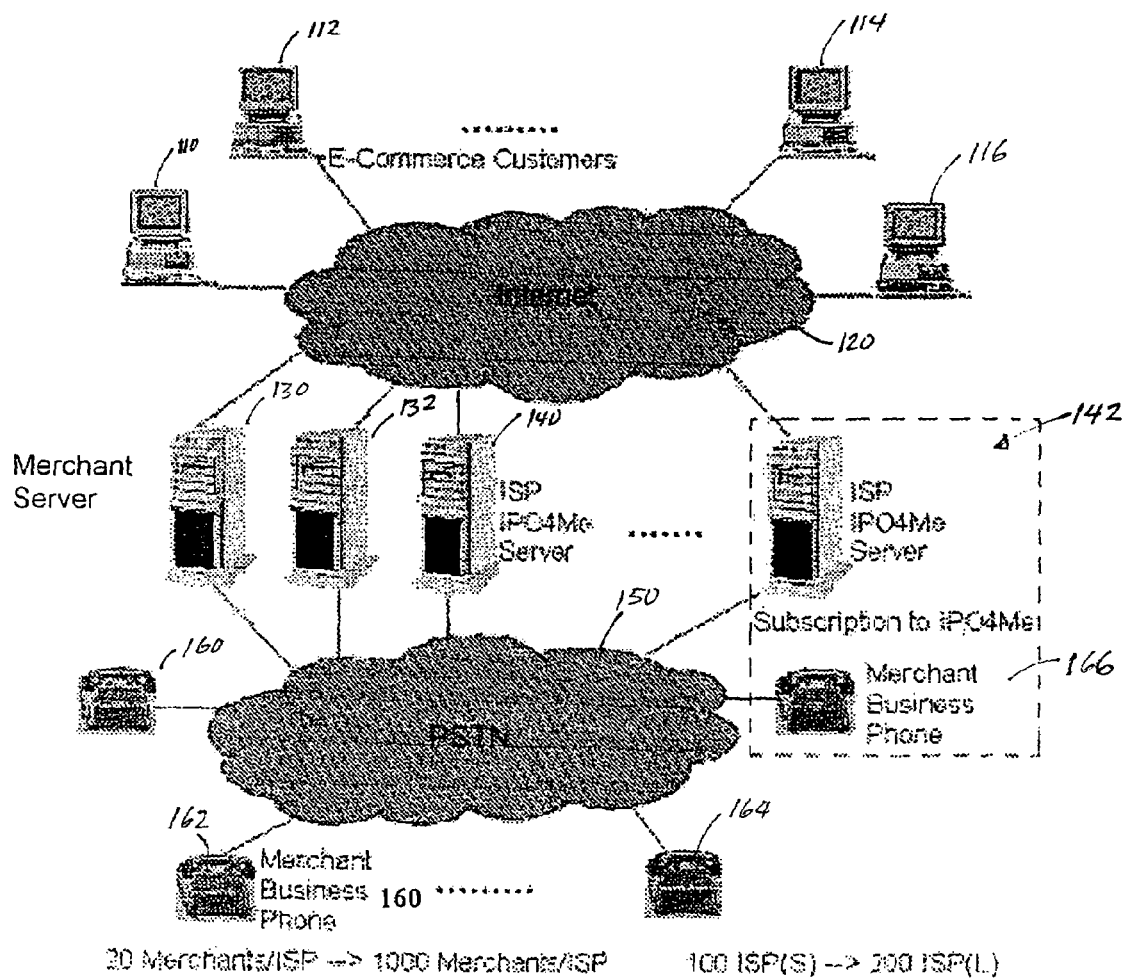
FIG. 1 illustrates an architectural and configurational block diagram according to an embodiment of the present invention.

FIG. 1 illustrates an architectural and configurational block diagram according to an embodiment of the present invention. FIG. 1 illustrates EVCS client systems 110, 112, 114, and 116, merchant receiving computer servers 130 and 132, ISP server 140, and external server, ISP service computer server 142 coupled to a computer network 120. As illustrated, merchant servers 130 and 132, ISP server 140, and external server 142 are also coupled to a PSTN (telephone) network 150. In turn, PSTN network is coupled to telephones 160, 162, 164, and 166.

In the present embodiment, client systems 110-116 are multi-media enabled computers, as will be described further below. Client systems 110-116 are used to initiate communications to telephones 160-166. In the present example, client systems 110-116 are typically provided with a web browser including plug-in programs, and other software, as will be further described below.

Client systems 110-116 are typically connected to computer network 120 via local area networks, via dial-up modems, ISDN, DSL, cable modems, satellite modems, wireless networks, or the like. In other embodiments, client systems 110-116 may be coupled to computer network 120 via a LAN, via a wireless network, and the like.

In this example, merchant servers 130 and 132 are typically web servers and/or gateway servers physically resident on the merchants property. Merchant servers 130 and 132 as web servers are typically used to host the merchant's web site including storage of web pages, a database, and the like. As will be described below, merchant servers 130 and 132 as gateway servers provide client systems 110-116 access to PSTN 150. In the present example, merchant servers 130 and 132 as gateway servers typically include a voice modem, a sound card, and software, as will be further described below.

In other embodiments of the present invention, merchant servers 130 and 132 may be located at other locations than at the merchant's property.

In this example, ISP server 140 is typically a web server and/or a gateway server physically resident at an internet service provider's premise. ISP server 140 as a web server is typically used to host the merchant's web site including storage of web pages, a database, and the like. As will be described below, ISP server 140 as a gateway server provides client systems 110-116 access to PSTN 150. In the present example, ISP server 140 as a gateway server typically includes a voice modem, a sound card, and software, as will be further described below.

In this example, external server 142 is typically a gateway server resident at a voice communication solution provider, such as an ISP. External server 142 is also typically used to host the merchant's web site including storage of web pages, a database, and the like. External server 142 provides client systems 110-116 access to PSTN 150. In the present example, external server 142 typically includes a voice modem, and software as will be further described below.

Computer network 120 is typically a wide area network (WAN) such as the Internet, or the like. In this embodiment, computer network 120 may use communication protocols such as TCP/IP, RTP, RTSP, or the like for the transfer of data. In alternative embodiments, computer network may be a local area network (LAN), based upon TCP/IP, IPX, or the like.

Computer network 120 provides data communication among EVCS client systems 110-116, merchant servers 130 and 132, ISP server 140, and external server 142. Data communication may include transfer of HTML based data, textual data, form submissions, plug-in programs or viewers, applets, packetized audio data, real-time streaming data, and the like. Although computer network 120 is illustrated as a single entity, as is the case with the Internet, it should be understood that computer network 120 may actually be a network of individual computers and servers.

In FIG. 1, telephones 160-166 are typically analog telephones coupled to PSTN 150 and to merchant server 130 and 132, ISP server 140, and external server 142. In alternative embodiments, telephones 160-166 may be digital telephones coupled via digital switching interfaces to PSTN 150.

The diagram in FIG. 1 is merely an illustration which should not limit the scope of the claims herein. One of ordinary skill in the art would recognize many other variations, modifications, and alternatives.

Figure 2:
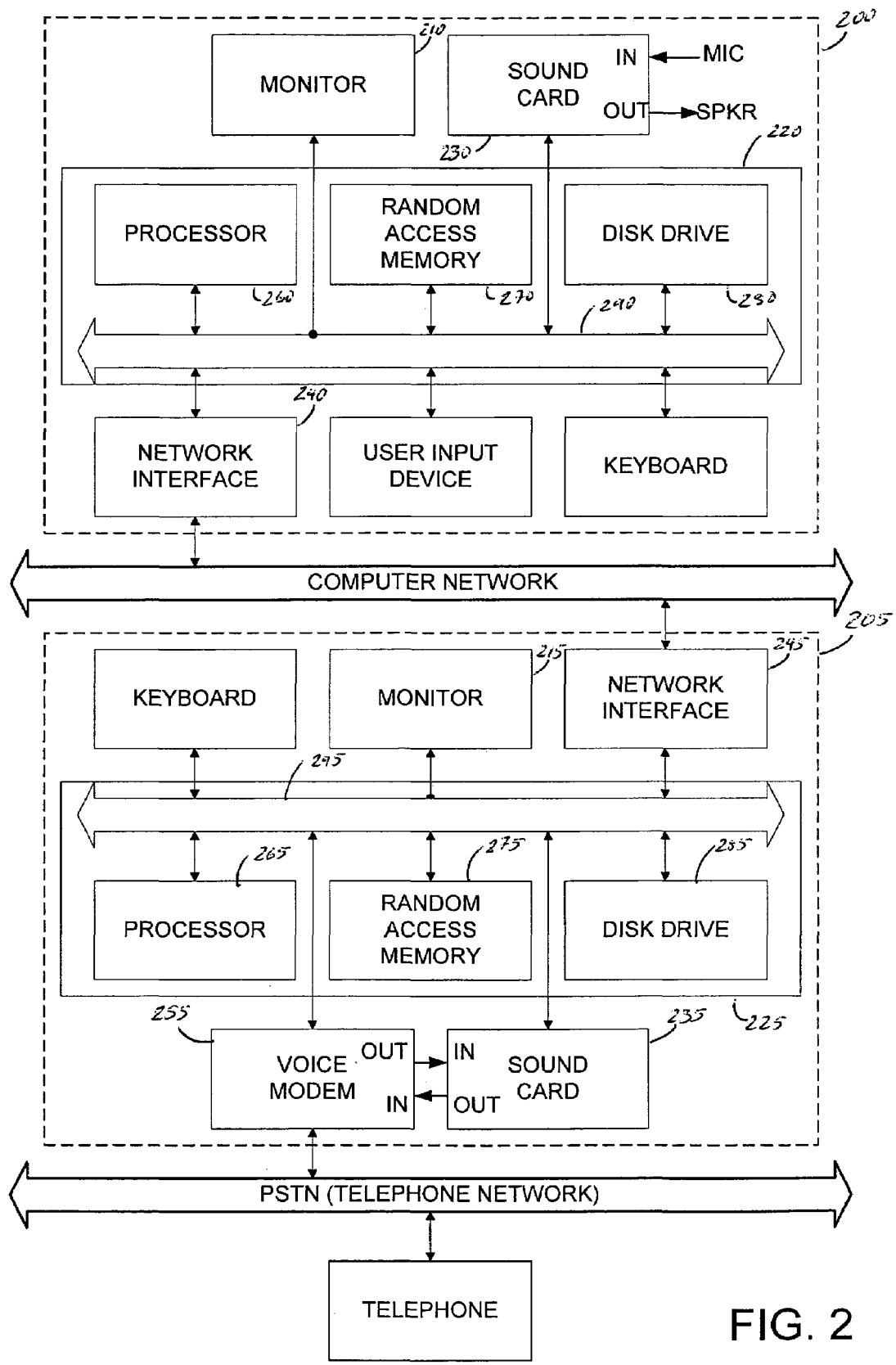
FIG. 2 is representative of types of client-server systems for embodying the present invention.

FIG. 2 is a block diagram of typical client-server computer systems 200 and 205 according to embodiments of the present invention. Embodiments of client systems 110-116 may be embodied as computer system 200. Further, embodiments of servers 130-142 may be embodied as computer system 205.

In the present embodiment, computer systems 200 and 205 typically includes monitors 210 and 215, computers 220 and 225, keyboards, sound cards 230 and 235, graphical input devices, network interfaces 240 and 245, and the like. In the case of a server 130-142, computer system 205 also includes an available voice modem 255.

Voice modems 255 are typically full-duplex. In alternative embodiments, functionality of voice modem 255 may be included on the motherboard of computer 220 or as software-based modems. In embodiments of the present invention, voice modems 255 may be coupled to serial ports, coupled via special modem interface slots on the motherboard of computer 220, coupled via a Universal Serial Bus (USB), or the like.

Sound cards 230 and 235 are typical sound cards available on most multi-media equipped computers. As is well known, sound card 230 and 235 typically include analog to digital (AtoD) and digital to analog (DtoA) conversion hardware. In one embodiment, sound cards 230 and 235 may be sound cards that includes processing hardware such as is available from Creative Labs, or the like. In alternative embodiments, functionality of sound cards 230 and 235 may be on the motherboard of computer 220.

In one embodiment of the present invention, microphones and speakers may be directly coupled to sound card 230 via dedicated input and output connections. However in other embodiments, microphones and speakers may be coupled via serial buses such as the Universal Serial Bus (USB), or the like.

As illustrated in FIG. 2, for computer system 205 sound card 235 is coupled to voice modem 255. In this embodiment, the speaker output port of voice modem 255 is coupled to the microphone input (or line input) of sound card 235. Further, the speaker output port of sound card 235 is coupled to the microphone input of voice modem 255.

In the present embodiment, a user input device is typically embodied as a computer mouse, a trackball, a track pad, wireless remote, and the like. Graphical input devices typically allow the users to graphically select objects, icons, text and the like output on monitor 210 in combination with a cursor.

Embodiments of network interfaces 240 and 245 include an Ethernet card, a modem (telephone, satellite, cable, ISDN), (asynchronous) digital subscriber line (DSL) units, and the like. Network interfaces 240 and 245 are typically coupled to a computer network as shown. In other embodiments, network interfaces 240 and 245 may be on the motherboard of computers 220 or 225, may be a software program, such as soft DSL, or the like.

Computers 220 and 225 typically includes familiar computer components such as processors 260 and 265, and memory storage devices, such as a random access memory (RAM) 270 and 275, disk drives 280 and 285, and system bus(es) 290 and 295 interconnecting the above components.

In one embodiment, computers 220 and 225 are PC compatible computers having an x86 based microprocessor, such as an Athlon™ microprocessor from Advanced Micro Devices, Inc. Further, in the present embodiment, computer 220 typically includes Windows98 operating system, and computer 225 typically includes WindowsNT, both from Microsoft Corporation.

RAM 270 and 275 and disk drive 280 and 285 are examples of tangible media for storage of data, audio message files, computer programs, browser software, voice communication protocol software, embodiments of the herein described invention, applet interpreters or compilers, virtual machines, web pages, data bases and the like. Other types of tangible media include floppy disks, removable hard disks, optical storage media such as CD-ROMS and bar codes, semiconductor memories such as flash memories, read-only-memories (ROMS), and battery-backed volatile memories, and the like. In embodiments of the present invention, such as set top boxes, mass storage, such as disk drive 280, and the like may be dispensed with.

In the present embodiment, computer system 205 includes EVCS software that enables it to act as an server that communicates with client systems 110-116 using the HTTP, TCP/IP, RTP/RTSP protocols, and the like. In alternative embodiments of the present invention, other software and transfer and communication protocols may also be used, for example IPX, UDP or the like.

Higher level software programs, using and being compliant to communication protocols, such as HTTP, TCP/IP, RTP/RTCP, IPX, UDP, H.323 and SIP may be used to enable the client and server communication.

FIG. 2 is representative of types of system for embodying the present invention. It will be readily apparent to one of ordinary skill in the art that many other hardware and software configurations are suitable for use with the present invention. For example, other types of processors are contemplated, such as the Pentium-class, a Celeron-class, or other microprocessor from Intel Corporation, K6-x-class or other microprocessors from Advanced Micro Devices, PowerPC G3, G4 microprocessors from Motorola, Inc., and the like. Further, other types of operating systems are contemplated such as Solaris, LINUX, UNIX, MAC OS 9 from Apple Computer Corporation, BeOS, and the like.

Figure 3:
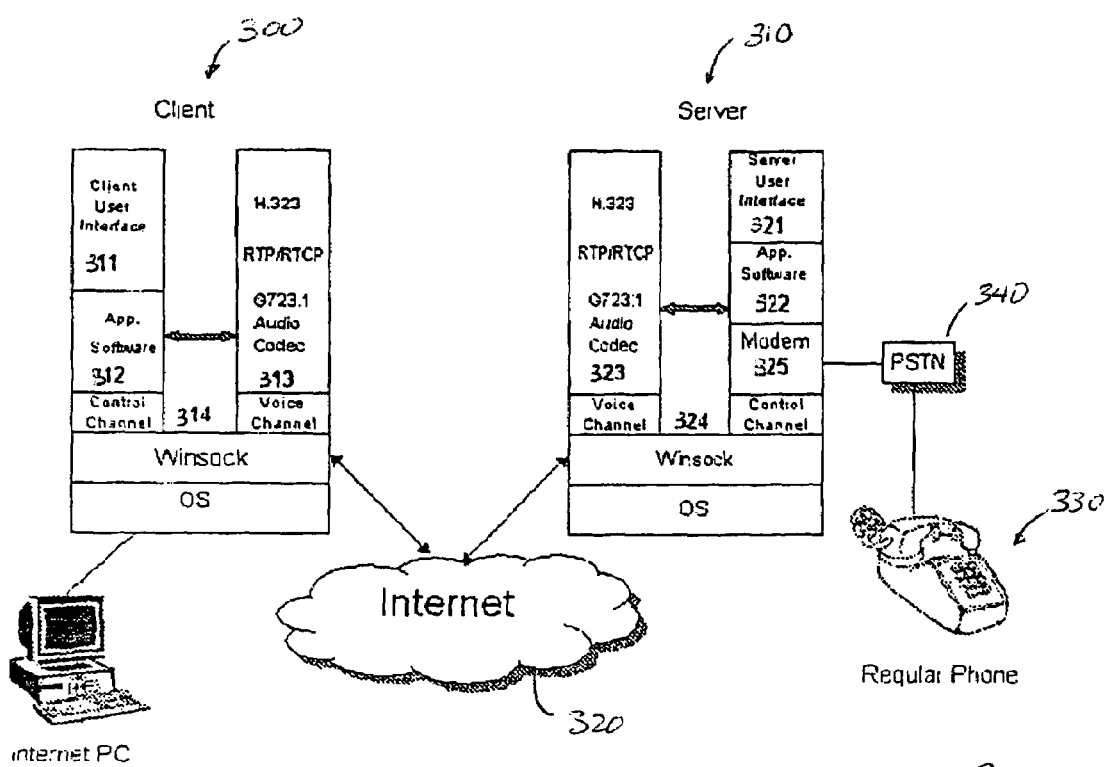
FIG. 3 illustrates a block diagram of an embodiment of the present invention, any client computer communicating to any PSTN phone.

FIG. 3 illustrates a block diagram of an embodiment of the present invention, enabling any client computer to communicate with any PSTN phone. In particular, FIG. 3 illustrates a logical block diagram of one embodiment of a client system 300 and a server 310 coupled via the Internet 320. As is illustrated, server 310 is coupled to a telephone 330 via PSTN 340.

In the present embodiment, client system 300 includes software modules including a user interface 311, a voice communication application 312, a voice communication protocol 313, and a voice channel control 314. These software modules are typically downloaded and installed to client system 300. In another embodiment, the software is loaded from a tangible media such as a CD-ROM, a floppy disk, or the like.

In one embodiment of the present invention, a user at the client system 300 requests the download of the software. In alternative embodiments, the software is automatically downloaded when the user wants to initiate a phone call to telephone 330. As an example, the software may be embodied as plug-in programs, and/or applets that are dynamically downloaded and installed onto client system 300.

In the present embodiment, user interface 311 is a graphical user interface for voice communication application 312 that together allow the user to initiate a phone call via graphical means without the need to interact manually with a telephone company's system during call. For example, user interface 311 allows users to view directories, specify or verify phone numbers, specify input and output parameters, and the like from within voice communication application 312. Embodiments of user interfaces 311 and voice communication application 312, will be illustrated and discussed further below. In the present embodiment, user interface 311 and voice communication application 312 are embodied as software provided by the assignee of the present invention.

In the present embodiment, server 310 typically includes software modules including a server user interface 321, a voice communication application 322, a voice communication protocol 323, and a voice channel control 324.

In the present embodiment, user interface 321 is a graphical user interface for voice communication application 322 that together allow the server to receive and place telephone calls to PSTN 340. For example, user interface 321 allows web masters, or the like to specify phone numbers to dial out, specify input and output parameters, and the like from within voice communication application 322. In the present embodiment, user interface 321 and voice communication application 322 are embodied as software provided by the assignee of the present invention.

In this example, voice communication protocols 313 and 323 provide protocol stacks and CODECs typically required for voice communications across a network. For example, in the present embodiment, protocols 313 and 323 are protocols compatible with the IETF H.323 standard. As is known, the H.323 standard specifies a series of protocols for voice and video conferencing over the Internet.

The preset embodiment of protocols 313 and 323, also specify RTP and RTCP protocols that are used for initiating voice sessions, transfer of voice packets with headers, monitoring of progress across the Internet, and the like. Additionally, protocols 313 and 323 may include any number of CODECs for compression and decompression of voice data such as G.723, G729, PCM, ADPCM, LDC, or the like.

In embodiments of the present invention, commercial programs such as Microsoft's NetMeeting has adopted a set of protocols to enable voice communications applications. In particular, NetMeeting, or the like, may be used in lieu of using specific protocol programs. For example, NetMeeting may provide the H.323, RTP/RTCP G.723.1 codec, and the like client-side protocols 313 and server-side protocols 323 illustrated. In other embodiments, proprietary versions of H.323 may also be used, such as Lucent Corporation's Elmedia H.323 stack and G.723.1/G.729; NetMeeting protocol stack and CODEC; and the like.

In the present embodiment, server 310 includes a modem 325. Modem 325 is used to receive commands and voice data for output onto the PSTN and voice data from the PSTN. A more detailed description will be given below.

In the present embodiment client 300 and server 310 include operating systems (OS) such as Windows98™, WindowsNT™, or the like, and Winsocks that enable client 300 and server 310 to establish links between the computer and the communications channels.

Figure 4A:
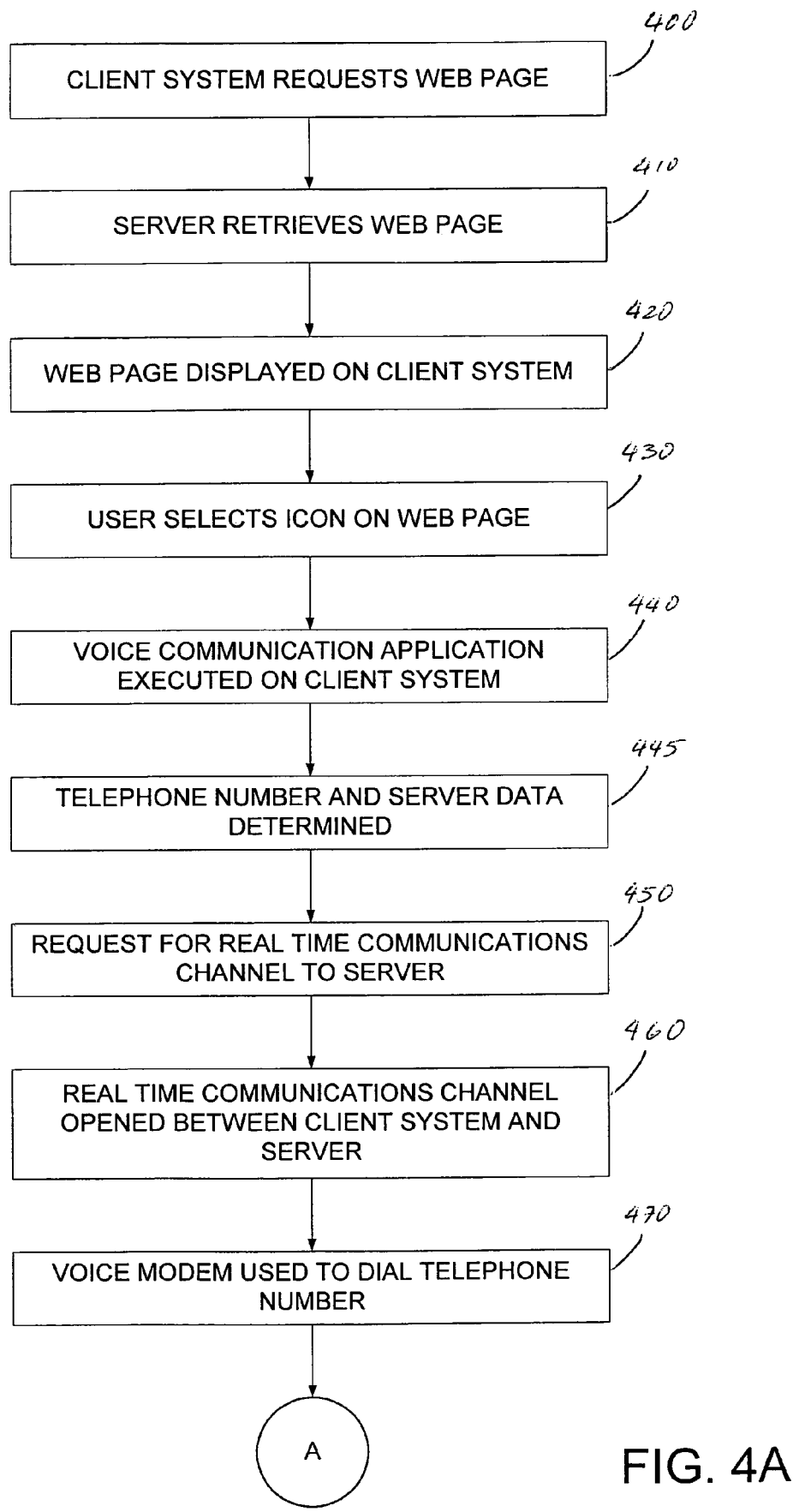
FIG. 4 illustrates a flow diagram of an embodiment of the present invention.
Figure 4B:
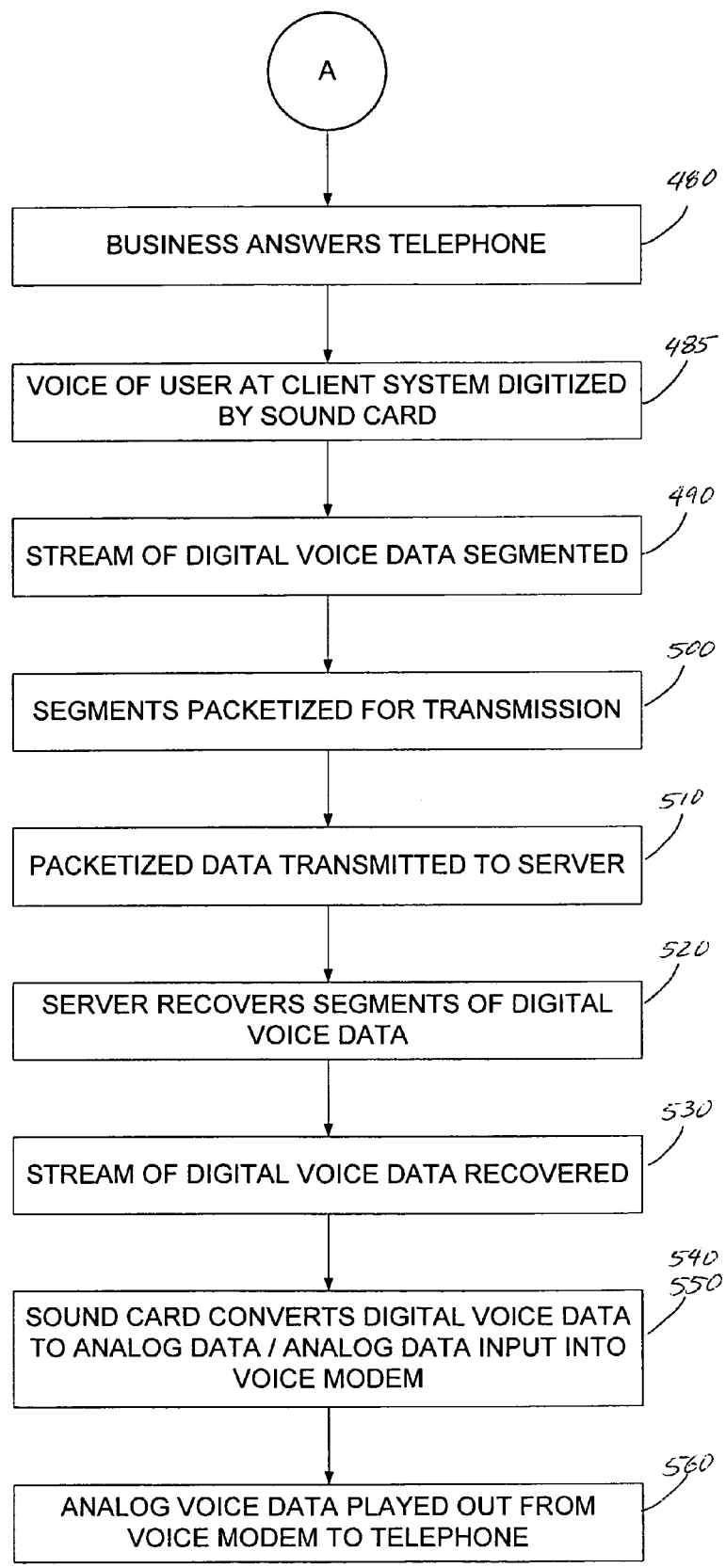

FIG. 4 illustrates a flow diagram of an embodiment of the present invention.

Initially a user at client system 300 requests a web page from server 310, step 400. In one embodiment, the user types-in a URL of the web page in a web browser, and in another embodiment, the user selects a hyperlink associated with the web page. In other embodiments, the web page is a pre-programmed or default page for a web browser. In the present embodiment, client system 300 and server 310 communicate via TCP/IP protocols.

In response to the request, server 310 retrieves the web page, step 410. For example, server 310 retrieves HTML encoded text, images, and the like. In one embodiment, the web page also includes javascript routines, function calls to plug-in or other application programs, or the like.

After retrieving the web page, the web page is then sent to client system 300 for display, step 420. In one embodiment, the web page includes an icon according to an embodiment of the present invention. Next, the user selects the icon on the display, step 430. The user may do this by clicking upon the icon with a user input device such as a mouse, or the like.

In the present embodiment, when the icon is selected, voice communication application 312 (FIG. 3) is executed, step 440. Next, the telephone number to dial on the PSTN is determined, step 445. In one embodiment, voice communication application 312 is automatically given a telephone number to dial when the icon is selected. For example, the web page may be associated with a business such as Amazon.com, then when a user clicks upon the icon on the display, the voice communication application 312 is executed, and a telephone number associated with the business is automatically used as input. In one embodiment, the web page includes the telephone number. In another embodiment, the telephone number is entered manually by the user.

In the present embodiment, the telephone number is the conventional telephone number that the business, or the like, uses to receive telephone calls. For example, a small business may have only one telephone line and use the telephone line to receive and make telephone calls. With the present embodiment, the small business may also receive telephone calls originated from client system 300 using the same telephone line. In alternative embodiments, telephone calls originated from client system 300 may be sent to a telephone line reserved for such calls.

In one embodiment of the present invention, the telephone number is stored within the web page and selection of the icon requests voice communication application 312 to execute using the telephone number as input. In an alternative embodiment, application 312 has pre-stored a number of telephone numbers from certain businesses, persons, or the like. Next, when a user selects the icon, the name of the business, or the like is sent to application 312. In response, application 312 looks-up the appropriate telephone number to dial.

Next, using signaling protocols, such as Q.931, H.245, RAS, or the like, client system signals the desire to open a real-time communications with server 310, step 450. These signaling protocols are specified by the H.323 protocol.

In the present embodiment, the telephone number is also sent to the server 310. In alternative embodiments, client system 300 sends only the call request to server 310. In response, server 310 receives the call request and then determines the telephone number to dial on PSTN.

In response to the signaling, a real-time communications channel is opened-up between client system 300 and server 310, step 460. For example, a real-time channel such as RTP, RTCP, or the like is opened between client system 300 and server 310.

In another embodiment, step 460 may be performed before step 445. In particular, a real time communications channel is first opened between the client and the server. After the channel is open, the telephone number may be determined and the like.

In the present embodiment, at the same time server 310 uses a voice modem to dial the telephone number specified by client system 300, or otherwise, step 470. Typically server 310 is coupled to a telephone network such as PSTN 340, thus server 310 can directly dial the telephone number via the voice modem by giving a set of appropriate "AT" modem commands compliant to voice modem protocol standards. In an alternative embodiment, dial-out prefixes such as "9" or "8" may be added to the telephone number before dialing.

The party being called answers the telephone call in a conventional manner, e.g. picking-up the receiver of the telephone called, step 480. In the present embodiment, the party may be a business, an individual, or the like.

In the present embodiment, while the real-time channel is open, as one party talks on the telephone, the voice is digitized, step 485. For example, as the user at client system 300 speaks into a microphone, their voice is digitized by the sound card and/or Audio codec in client system 300. Next, the digitized voice data is split-up into separate segments of voice data, step 490. The separate segments of voice data are then packetized for transmission, step 500. In the present embodiment, RTP headers are added to the segments of voice data. For example, the RTP header may include a version identifier, an extension bit, payload type identifiers, sequence numbers, time stamps, and the like. In the present embodiment, the above two steps may be performed by voice communication protocol 313. The specific details of real-time protocols such as RTP, RTSP, and the like are beyond the scope of the present patent disclosure.

Next, the packetized data is then transmitted across the Internet and received by server 310, step 510. In response to the packetized data, server 310 rearranges the packets into the correct order and strips the headers from the packets, step 520. Next, the separate segments of voice data are reassembled into a stream of digital voice data, step 530. In the present embodiment, the above two steps may be performed by voice communication protocol 323, more specifically via the audio codec.

The stream of digital voice data is then output to sound card 235, step 540. In response, sound card 225 converts the stream of digital voice data to a stream of analog voice data, step 550. The stream of analog voice data is then streamed to PSTN 340 via voice modem 255 and then played to telephone 330, step 560. In particular, the audio or speaker output of sound card 235 is coupled to the microphone, or line input of voice modem 255. Accordingly, analog data output from sound card 235 is input to voice modem 255, and in turn the analog data is then output from voice modem 255 to PSTN 340.

When the party being called on telephone 330 wants to talk to the user at client 300, a similar process described above is repeated. However, sound card 235 is used to digitize the voice of the party being called. In particular, the audio or speaker output of voice modem 255 is coupled to the microphone, or line input of sound card 235. Accordingly, analog data received by voice modem 255 from PSTN is output to sound card 235, and in turn the analog data is digitized by sound card 235. This digital data is formatted by voice communication protocol 323 and passed to client system 300. Sound card 230 and the audio codec at client system 300 is then used to convert the digital voice data back to analog data for playback on speakers, or the like attached to client system 300.

Figure 5:
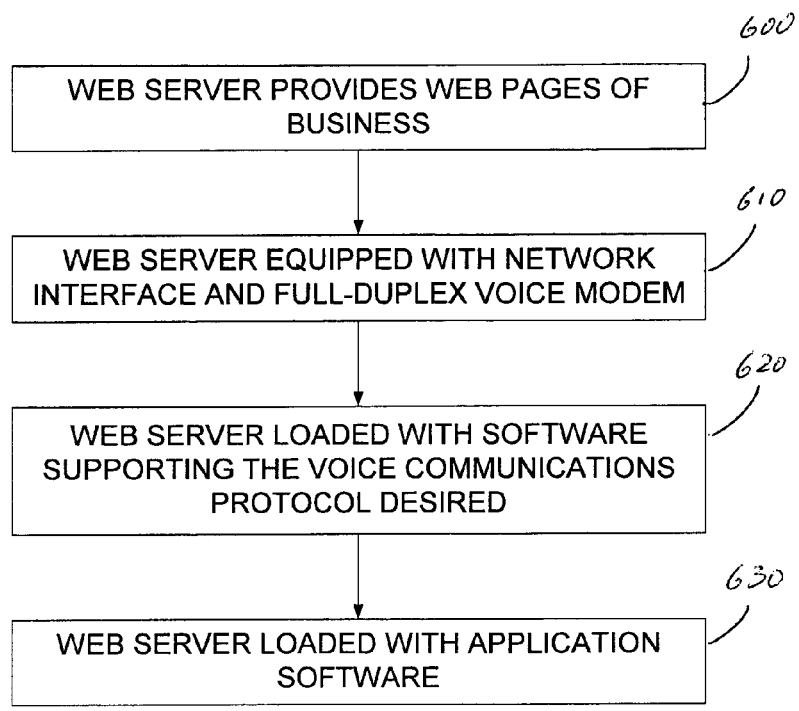
FIG. 5 illustrates another embodiment of the present invention.

FIG. 5 illustrates another embodiment of the present invention. In particular, FIG. 5 illustrates a process of enabling a standard server to send and/or receive telephone calls from client systems and in response to place outgoing telephone calls.

Initially a server is provided, step 600. In the present embodiment, server may be a merchant server, such as 130-132, i.e. a server that is owned or leased by a business or the like that provides web pages to clients systems 110-116. In an alternative embodiment, the server may be provided by an ISP such as ISP server 140, in FIG. 1. In such an example, the ISP typically hosts web pages of the business, or the like.

In the present embodiment, the server is configured with both a network interface, a sound card, and a voice modem, step 610. For example, network interface may provide T1, T3, or the like access between the server and the Internet. In this step a voice modem is typically coupled to a telephone line to allow users to dial-in or for call-back service. A sound card is also provided. The microphone, or line input to the sound card is coupled to the speaker out, or line output of the voice modem and the microphone, or line input to the voice modem is coupled to the speaker out, or line output of the sound card. These may be accomplished via miniature stereo or mono plugs, or the like.

Next, a voice communications protocol software and gateway software are loaded onto the server, step 620. In embodiments of the present invention, the voice communications protocol software and the gateway software are downloaded from the Internet, or loaded from a tangible media, such as CD-ROM, and the like. As described above, the voice communications protocol software provides the necessary protocol handling functions for the server to send and receive telephone calls to/from the Internet, or the like, thus providing the gateway server function. In one embodiment, the protocol is the H.323 protocol, however other types of protocols may also be used in other embodiments.

An application program is then loaded on the server, step 630. In embodiments of the present invention, the application program is downloaded from the Internet, or loaded from a tangible media, such as a CD-ROM, and the like. In the present example, as described above, the application program (or series of programs) receives streams of digital voice data from the Internet, via the voice communications protocol, determines the telephone number to dial, commands the voice modem to dial the telephone number, sends the digital voice data to the voice modem for conversion back into analog form, and the like. Further, the application program directs the modem to receive analog voice data from the telephone line, directs the sound card to convert the data to digital form, to pass the digital data for processing by the voice communications protocol software, and the like. In an alternative embodiment, steps 620 and 630 may be performed in a single step.

In an alternative embodiments, telephone calls may be placed from servers to client systems. In another embodiment, the client program and the gateway program may be placed on the same computer system.

Figure 6:
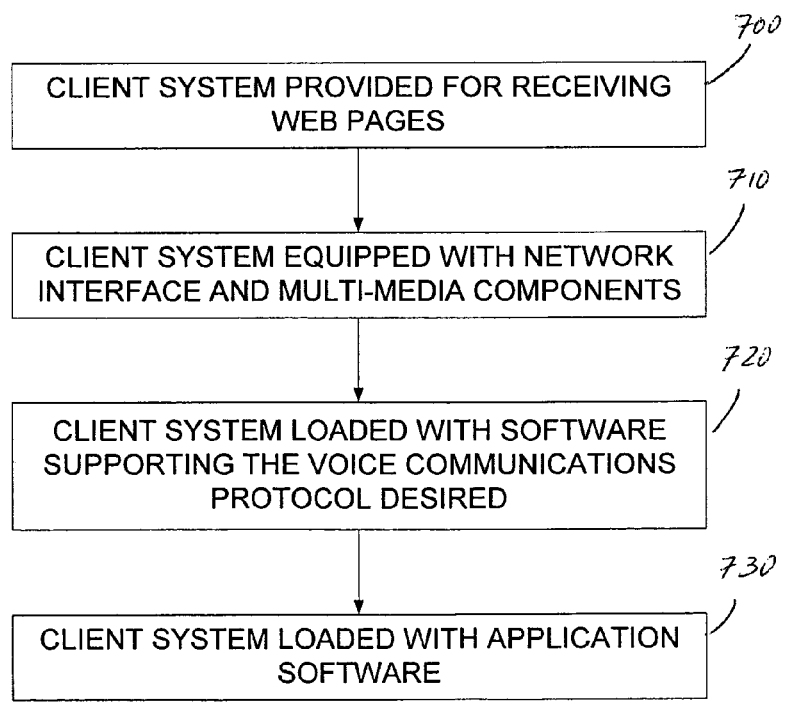
FIG. 6 illustrates another embodiment of the present invention.

FIG. 6 illustrates another embodiment of the present invention. In particular, FIG. 6 illustrates a process of enabling a client system to send and/or receive telephone calls to a server.

Initially a client system is provided, step 700. In the present embodiment, client system may be a home computer, a computer at a business, a computer at a learning institution, or the like. In the present embodiment, the EVCS client system is typically configured with either a network interface or a modem, step 710. For example, network interface/modem may provide DSL, ISDN, T-1, T-3, 56K, 28.8K or the like access between the client system and the Internet.

Next, a voice communications protocol is loaded onto the client system, step 720. In embodiments of the present invention, the voice communications protocol is downloaded from the Internet, the protocol is loaded from a tangible media, such as CD-ROM, and the like. As described above, voice communications protocol provides the necessary protocol handling functions for the client system to send and receive packets of digitized voice data to/from the Internet, or the like. In one embodiment, the protocol is the H.323 protocol, however other types of protocols may also be used in other embodiments.

An application program is then loaded on the client system, step 730. In embodiments of the present invention, downloaded from the Internet, loaded from a tangible media, such as a CD-ROM, and the like. In the present example, as described above, the application program (or series of programs) sends streams of digital voice data, via the voice communications protocol software, to the Internet. Further, the application program directs streams of digital voice data received from the Internet to be played via a sound card to speakers.

In an alternative embodiments, telephone calls may be received from client systems from servers.

Figure 7:
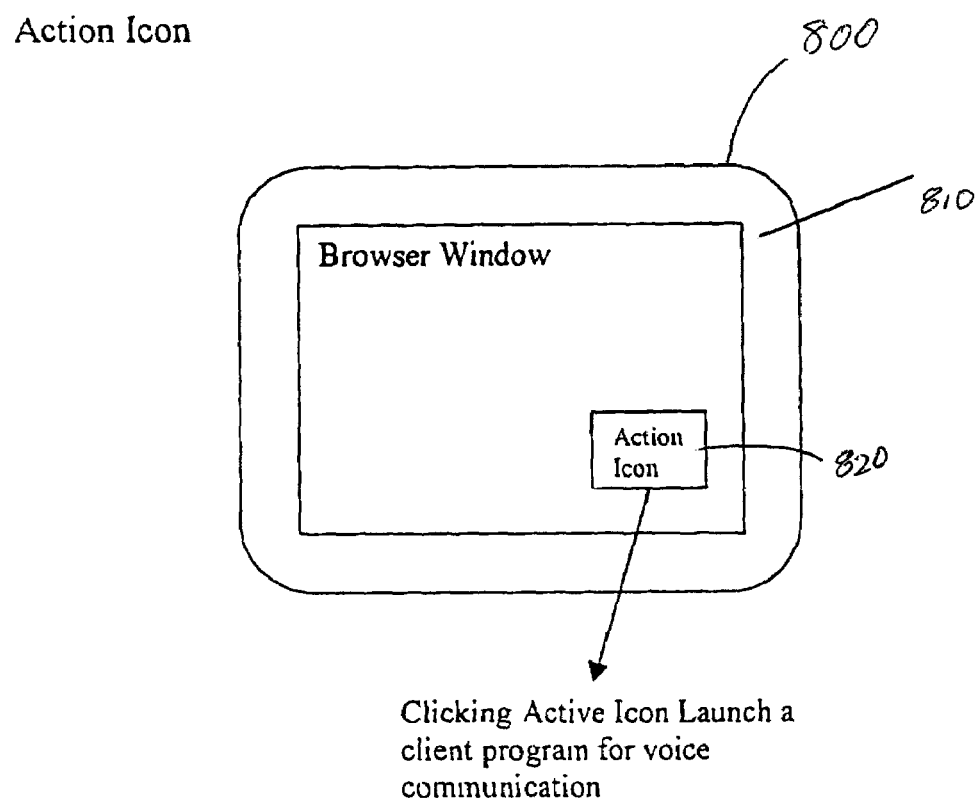
FIG. 7 illustrates a graphical user interface according to an embodiment of the present invention, an e-commerce voice communication symbol represented by an action icon.

FIG. 7 illustrates a graphical user interface according to an embodiment of the present invention. In particular, FIG. 7 illustrates a web page according to an embodiment.

FIG. 7 includes a display 800 of a client system. Display 800 includes a web browser window 810. In the present embodiment, web browser may be Netscape Navigator, or similar. The web browser is typically compliant with HTML 3.0. Window 810 typically displays web pages compliant with HTML. These web pages may also include javascript functions, applets, plug-in program data, and the like.

Web browser window 810 typically includes icon 820. In the present embodiment it is envisioned that web browser window 810 displays web pages of business, or the like. Further, it is envisioned that business, or the like that displays an icon such as icon 820 are inviting viewers of their web pages to initiate a telephone call to the business, or the like. For example the web page may be a web page selling an item or service, a web page displaying an order screen, or the like. If the viewer has a question, wants to place an order, or the like, the user can initiate embodiments by selecting icon 820 from those web pages.

In the present embodiment, functionally icon 820 is associated with a plug-in program function call. In particular, when a user clicks upon icon 820, embodiments of the present invention are executed. In this example, in response to the user clicking upon the icon 820, a telephone number, or the like is sent to embodiments of the present invention. In one embodiment, the telephone number is of a business, or the like. In the present embodiment, the telephone number may be embedded into the web page or retrieved from a local telephone directory. In response to the selection of the icon, the application program and the voice communications protocol begin the process of establishing a link between the client system and the server.

Figure 8:
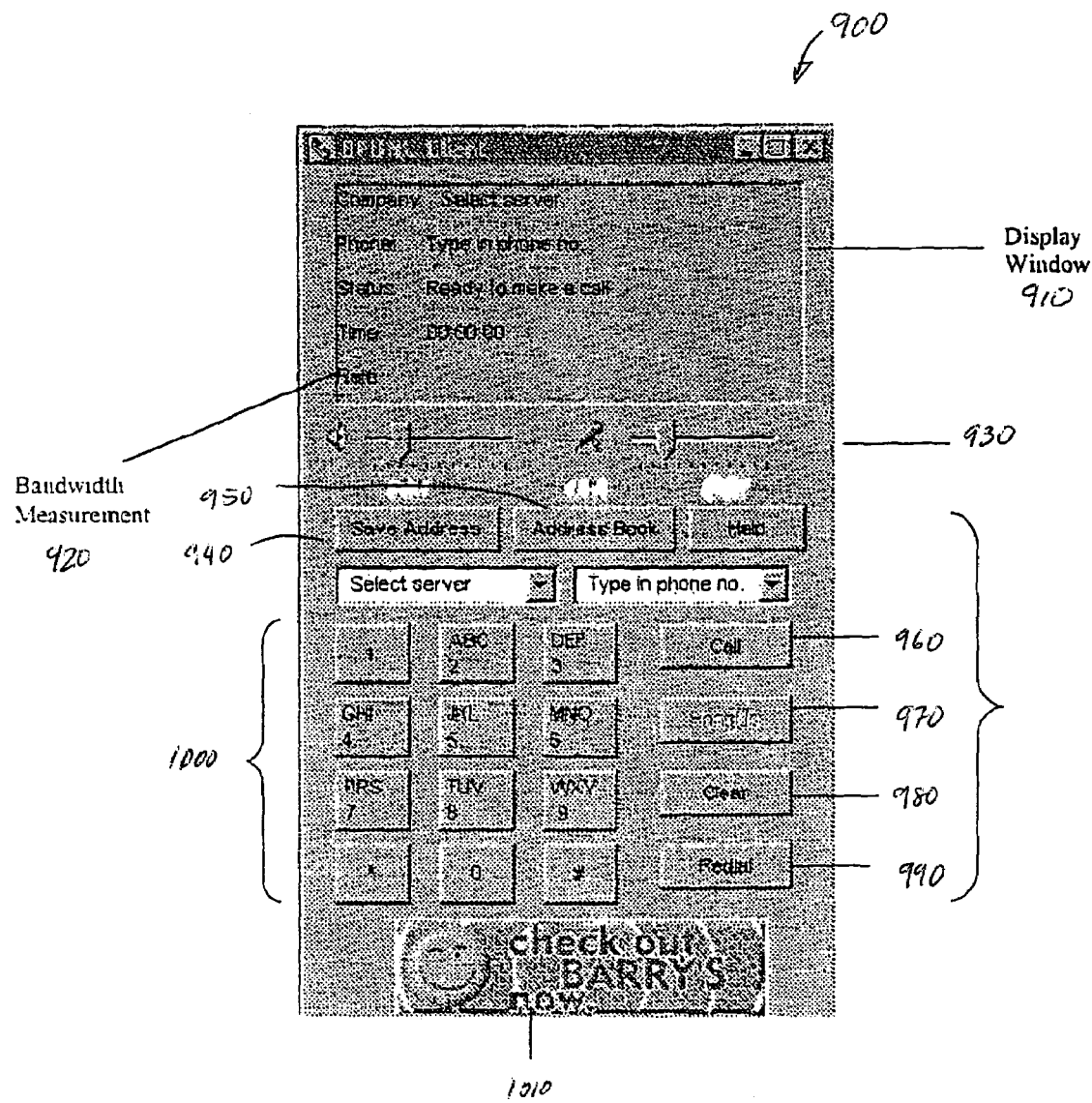
FIG. 8 illustrates a graphical user interface according to an embodiment of the present invention.

FIG. 8 illustrates a graphical user interface according to an embodiment of the present invention. In particular, FIG. 8 illustrates a GUI of an application program for a client system as was described above.

The GUI 900 includes a display window 910. In this embodiment, display window 910 may include data associated with business and/or server being called, for example, a name of the business, or the like, the telephone number being called, and the like. Further, display window 910 may include status data regarding the telephone call, such as the bandwidth available 920 for the telephone call, the duration of the call, and the like.

GUI 900 may also include control parameters 930. Control parameters 930 may include a volume control for the output of data to the speakers, and microphone sensitivity or gain, as shown. Further, other types of parameters may be controlled, for example, pitch, reverberation, echo, and the like. These parameters may be applied to either or both the data played out to the speakers, or the data captured by the microphone.

In the present embodiment, GUI 900 includes graphically selectable buttons or icons 940 and 950. Icon 940 enables a user to save the telephone number of the business, or the like being called into a telephone "directory." Icon 950 enables the user to view telephones numbers in their telephone directory, or electronic directory. Typically, these directories include server information identifying the server, the telephone number to be called, the name of the business, and the like. Additional information may also be stored including the referencing web page, the business home page, fax number, and the like.

In the present embodiment, the directory may be stored locally on the user's computer, or alternatively, stored in a particular web server or gateway server location. Pre-programmed directories may be provided to the user automatically or for the user to download and use. For example, one preprogrammed directory may include on-line computer stores, one preprogrammed directory may include airlines, and the like. It is envisioned that businesses may pay a premium to be included into preprogrammed directories.

For convenience, GUI 900 may also include icons 960-1000. In the present embodiment, icon 960 allows the user to begin a call. For example, after retrieving an address from a telephone directory, the user may then click upon icon 960 to start the calling process. In the present embodiment, when the user is viewing a web page, such as illustrated in FIG. 7, and clicks on icon 820 on the web page, it is envisioned that GUI 900 is opened, and the call be automatically started. In an alternative embodiment, after the user clicks on icon 820, the user manually starts the call process by clicking upon icon 960.

In this embodiment, icon 970 enables the user to hang-up or disconnect a call that is being placed. The call may be restarted by a user clicking upon icon 990. Icon 980 enables the user to clear the pending telephone server data. Further, the telephone number may be manually entered by the user clicking on icons 1000.

In the present embodiment, a server may be contacted and given a telephone number manually entered via icons 1000, or the like. However, the server may have restrictions on telephone numbers the server can call-out. For example, the server may limit the telephone numbers to telephone numbers pre-registered by the business, or the like. In other embodiments, the server may allow calling-out of any number entered by the user, however, tracks the destination and duration of the telephone call. The user may subsequently be charged for telephone call, or alternatively, during the telephone call advertising data may be played to the user. In the latter situation, advertisers may underwrite the costs of the call.

GUI 900 may also include a "hot-line" or advertising banner ad 1010. In one embodiment, the banner ad 1010 is a static ad displayed to the user. In alternative embodiments, when a user clicks on ad 1010, a telephone call is then placed to the sponsor of the advertisement. For example, in the example in FIG. 8, if a user clicks upon ad 1010, embodiments of the present invention initialize a telephone call to the server of "Barry's". In response, as described above, Barry's gateway server will subsequently place a telephone call across a PSTN to Barry's. It is envisioned that business will pay a premium to have a hot-line displayed within GUI 900.

FIGS. 9*a-c* illustrate graphical user interfaces according to embodiments of the present invention. In particular, FIGS. 9*a-c* illustrate GUIs of an electronic directory.

In this embodiment, GUI 1100 may include icons 1110-1140. Icon 1110 enables a user to view their personal address book. The address book may include telephone numbers, postal addresses, e-mail addresses, or the like. In addition, the address book may include a server and telephone number for use with the present embodiment. Once such a server and telephone number are displayed to the user in a display window, the user may place a call by selecting icon 1140. Alternatively, the user may select icon 1130. Selection of this icon 1130 enables the user to send e-mail to the desired party. In alternative embodiments, selection of icon 1130 may invoke the user's e-mail application program. In the present embodiment, icon 1120 enables display of pre-programmed directories, or the like, as described above.

In alternative embodiments, additional data and functions may also be provided. For example, on one embodiment, instant massaging data and icons are provided. Thus, the user may select an icon to send an instant message to the other party. In other embodiments, fewer such functions and options are provided to reduce clutter and user confusion, or the like.

FIG. 9*b* illustrates examples of information stored in address books, and the like. Further, FIG. 9*c* illustrates examples of a directory screen including pre-programmed directories, including a search function, and the like.

Figure 10A:
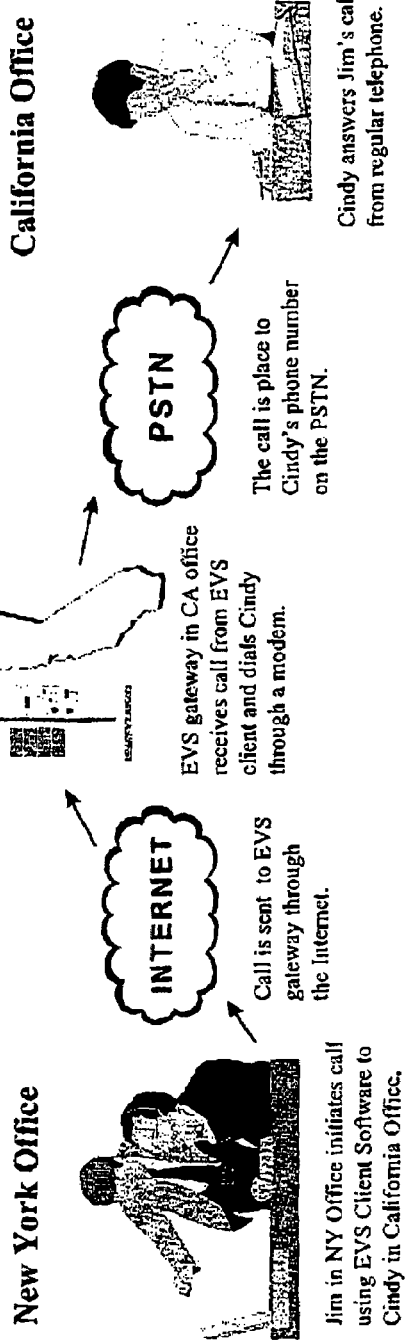
Figure 10A:
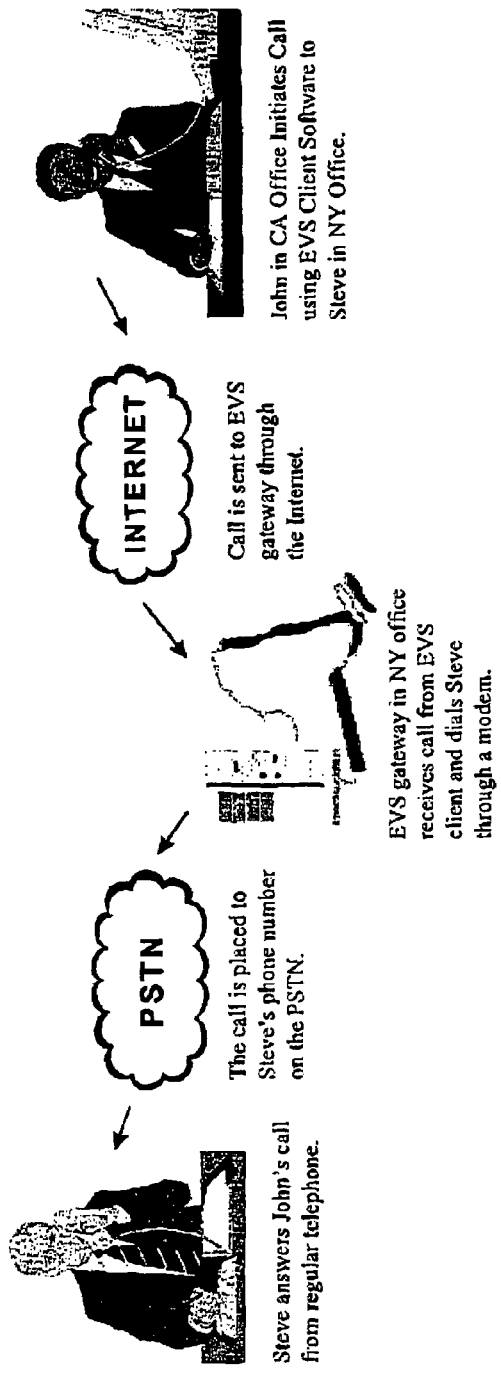
Figure 10C:
Figure 10C:
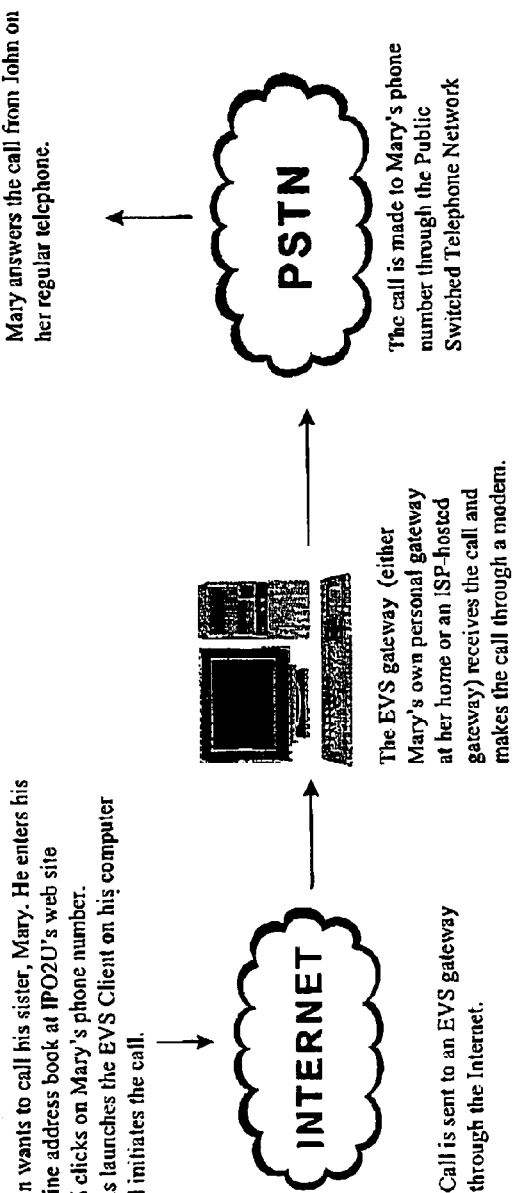

FIGS. 10*a*-10*c* illustrate embodiments of the present invention. In particular, in light of the above disclosure, the embodiments illustrated in FIGS. 10*a*-10*c* are enabled.

In FIG. 10*a*, using embodiments of the present invention, a telephone call may be placed between two branches of an office. For example, a caller at one branch will place a call via a web page, which is then routed via the Internet, to a gateway server at another branch. The gateway server at the other branch then places a local call via the PSTN to the desired party at the other branch.

The embodiment of FIG. 10*b* was described above.

In FIG. 10*c*, using embodiments of the present invention, a telephone call may be placed between two specific persons. For example, a caller will place a call via a web page, which is then routed via the Internet, to a gateway server. Typically the gateway server may be geographically close to the desired party. The gateway server in turn places a local call via the PSTN to the desired party. In embodiments, the gateway server may be a personal gateway server or an ISP-hosted gateway server.

In the foregoing specification, the invention has been described with reference to specific exemplary embodiments thereof. Many changes or modifications are readily envisioned. For example, other voice communications protocol than H.323 may be used, other CODECs may also be used. In another embodiment, it is envisioned that a sound card, such as sound card 235 and a voice modem, such as voice modem 255, may be integrated in the future.

The block diagrams of the architecture and flow charts are grouped for ease of understanding. However it should be understood that combinations of blocks, additions of new blocks, re-arrangement of blocks, and the like are contemplated in alternative embodiments of the present invention.

What is claimed is:

1. A method for operating a server comprises:
   receiving a request from a client computer to initiate a telephone call via the Internet in response to a single click on an advertisement;
   wherein the client computer has an installed e-commerce voice solution (ECVS) program, wherein opening the ECVS program displaces a graphical user interface (GUI) on a computer display device of the client computer, and wherein the GUI contains the advertisement, the advertisement stored on the client computer;
   initiating a real-time communications channel between the client computer and the server via the Internet in response to the request;
   determining a telephone number in response to the request;
   using a voice modem, coupled to the server and to a telephone line, to dial the telephone number;
   receiving packets of voice data from the client computer from the Internet;
   reassembling the packets of voice data into a stream of digital voice data;
   converting the stream of digital voice data to a stream of analog voice data;
   outputting the stream of analog voice data to the voice modem, and
   outputting the stream of the analog voice data from the voice modem to the telephone line.

2. The method of claim 1 wherein determining the telephone number in response to the request comprises retrieving the telephone number from a memory in the server in response to the request.

3. The method of claim 1 wherein the request comprises the telephone number.

4. The method of claim 1 wherein receiving a request from the client computer to initiate the telephone call comprises
   receiving the request from the client computer to initiate the telephone call via another voice modem.

5. A method for operating a server comprises:
   receiving a request at a server from a client computer to initiate a telephone call via a computer network, the request from the client computer in response to a single click on an advertisement, wherein the client computer has an installed e-commerce voice solution (ECVS) program, wherein opening the ECVS program displaces a graphical user interface (GUI) on a computer display device of the client computer, and wherein the GUI contains the advertisement, the advertisement stored on the client computer;

initiating a real-time communications channel at the server to the client computer via the computer network in response to the request from the client computer;

determining a telephone number to dial in response to the request;

dialing the telephone number on a telephone with a voice modem, the server comprising the voice modem and the voice modem coupled to the telephone line;

receiving packets of voice data at the server from the client computer;

reassembling at the server the packets of voice data into a stream of digital audio data;

converting the stream of digital audio data to a stream of analog audio data with a sound board within the server;

outputting the stream of analog audio data to the voice modem, and outputting the stream of the analog audio data from the voice modem to the telephone line.

6. The method of claim 5 wherein determining the telephone number comprises retrieving the telephone number from a memory in the server in response to the request.

7. The method of claim 6 wherein the request comprises a first telephone number and the telephone number comprises a second telephone number.

8. The method of claim 1 wherein the telephone number is contained in the web page.

9. The method of claim 1 wherein the telephone number is a telephone number is reserved for calls responsive to the web page.

10. The method of claim 5 wherein the telephone number is contained in the web page.

11. The method of claim 5 wherein the telephone number is a telephone number is reserved for calls responsive to the web page.

12. A method for operating a server comprises:

receiving a request from a client computer to initiate a telephone call via the Internet a single click on an advertisement, wherein the client computer has an installed e-commerce voice solution (ECVS) program, wherein opening the ECVS program displaces a graphical user interface (GUI) on a computer display device of the client computer, and wherein the GUI contains the advertisement, the advertisement stored on the client computer;

initiating a real-time communications channel between the client computer and the server via the Internet in response to the request;

determining a telephone number in response to the request;

using a voice modem, coupled to the server and to a telephone line, wherein the telephone line is connected to a POTS and PSTN service, to dial the telephone number, wherein a voice connection through both the PSTN and Internet networks is established.

13. The method of claim 5 wherein the telephone number is a telephone number is reserved for calls responsive to the web page.

14. The method of claim 5 wherein the telephone number is contained in the web page.

* * * * *